(12) United States Patent
Mallard, Jr. et al.

(10) Patent No.: US 6,650,839 B1
(45) Date of Patent: Nov. 18, 2003

(54) METHOD AND APPARATUS FOR OPTICAL MEDIA ACCESS PROTECTION IN A PASSIVE OPTICAL NETWORK

(75) Inventors: William C. Mallard, Jr., Nashua, NH (US); Colby Dill, III, Holliston, MA (US)

(73) Assignee: Quantum Bridge Communications, Inc., Andover, MA (US)

( * ) Notice: Subject to any disclaimer, the term of this patent is extended or adjusted under 35 U.S.C. 154(b) by 0 days.

(21) Appl. No.: 09/576,668

(22) Filed: May 23, 2000

(51) Int. Cl.[7] .............................................. H04B 10/08
(52) U.S. Cl. ............................... 398/9; 398/10; 398/15; 398/17; 398/33; 398/71; 398/72; 398/100; 398/79; 398/182; 398/195
(58) Field of Search ............................... 398/9, 10, 17, 398/15, 33, 71, 100, 72, 182, 195, 63; 370/79, 222–224

(56) References Cited

U.S. PATENT DOCUMENTS

| | | | |
|---|---|---|---|
| 4,692,919 A | | 9/1987 | West, Jr. |
| 4,701,910 A | | 10/1987 | Ulug |
| 4,885,794 A | * | 12/1989 | Sgrignoli ........................ 455/5 |
| 5,809,026 A | | 9/1998 | Wong et al. |
| 6,108,112 A | * | 8/2000 | Touma ........................ 359/110 |
| 6,498,667 B1 | * | 12/2002 | Masucci ....................... 359/157 |

OTHER PUBLICATIONS

ITU–T Recommendation G.983.1 "Broadbend Optical Access System Based on Passive Optical Networks (PON)", Oct. 1998.

* cited by examiner

Primary Examiner—Leslie Pascal
Assistant Examiner—Hanh Phan
(74) Attorney, Agent, or Firm—Hamilton, Brook, Smith & Reynolds, P.C.

(57) ABSTRACT

An apparatus and method is disclosed for protecting access to a shared medium in an optical communications system which has plural remote terminals coupled to a central terminal over the shared medium. According to one aspect, if an optical transmitter for an individual remote terminal is active for a first prescribed time interval when it has not been enabled for such transmission, the optical transmitter is disabled. According to another aspect, the continuous time that an individual terminal is enabled to transmit onto the shared medium is monitored. If the enabled transmission for the individual terminal exceeds a second prescribed time interval, the optical transmitter for the individual terminal is disabled.

17 Claims, 5 Drawing Sheets

METHOD AND APPARATUS FOR OPTICAL MEDIA ACCESS PROTECTION IN A PASSIVE OPTICAL NETWORK

BACKGROUND OF THE INVENTION

In Ethernet networks that operate over shared copper media, e.g., IEEE 802.3 standards for 10Base5, 10Base2 and 10BaseT, apparatus in the network access device for a connected terminal typically includes a so-called "jabber" circuit that monitors the length of transmission into the copper media for that individual terminal. If the continuous transmission of the individual terminal exceeds an accepted maximum length of time many times a maximum size packet, that terminal is disabled for a quiet period of, e.g., 500 milliseconds and then usually is allowed to resume transmission.

In a shared transmission medium such as a passive optical network which is shared among multiple terminals, it is important for proper operation that each terminal transmit onto the shared medium at assigned times and only for the assigned time interval. If such rules of operation are violated, the integrity of the system transmission can be severely compromised.

SUMMARY OF THE INVENTION

There is a need for a mechanism for protecting access to a shared optical medium in order to ensure that a faulty terminal does not affect system operation and integrity.

The present invention provides an apparatus and method for protecting access to a shared transmission medium. According to one aspect, if an optical transmitter for an individual terminal is active for a first prescribed time interval when it has not been enabled for such transmission, the optical transmitter is disabled. According to another aspect, the continuous time that an individual terminal is enabled to transmit onto the shared medium is monitored. If the enabled transmission for the individual terminal exceeds a second prescribed time interval, the optical transmitter for the individual terminal is disabled.

Accordingly, in an optical communications system which has plural remote terminals coupled to a central terminal or hub over a shared optical transmission medium, wherein the plural remote terminals are configured to transmit data on the shared optical transmission medium at prescribed transmission time intervals and in a prescribed sequence, a remote terminal apparatus comprises an optical transmitter for transmitting data onto the shared optical transmission medium, a fault monitoring circuit and a deactivation circuit. The fault monitoring circuit is coupled to the optical transmitter for monitoring activity of the optical transmitter and providing a fault indication signal when optical transmitter activity occurs for a duration that exceeds a fault time interval. The deactivation circuit is responsive to the fault indication signal to deactivate the optical transmitter.

In a first embodiment, the optical transmitter includes an optical detector for detecting the presence of optical transmitter energy into the shared medium to provide an activity signal to the fault monitoring circuit which operates to provide the fault indication signal upon the activity signal being present for a duration that exceeds the fault time interval.

In another embodiment, the remote terminal apparatus includes a transmitter controller that provides a transmit enable signal for enabling the optical transmitter wherein under normal operation of the remote terminal the transmit enable signal is asserted during the prescribed transmission time interval. The optical transmitter includes an optical detector for detecting the presence of optical transmitter energy into the shared medium to provide an activity signal to the fault monitoring circuit which operates to provide the fault indication signal upon the transmit enable signal being unasserted and the activity signal being present for a duration that exceeds the fault time interval.

According to an aspect, the fault monitoring circuit includes a timer circuit comprising a resistance-capacitance time constant circuit having an input coupled to the activity signal for establishing the fault time interval which can be less than the prescribed transmission time interval.

According to another aspect, the remote terminal apparatus further includes a second fault monitoring circuit for monitoring the transmit enable signal to provide a second fault indication signal upon the transmit enable signal being asserted for a duration exceeding a second fault time interval. The deactivation circuit includes a fault latch for latching the first and second fault indication signals for deactivating the optical transmitter.

According to yet another aspect, the second fault monitoring circuit includes a second timer circuit comprising a voltage ramp generator that has an input coupled to the transmit enable signal to provide a ramp voltage and a voltage comparator that has a first input coupled to the ramp voltage and a second input coupled to a reference voltage. The voltage comparator is operable to provide the second fault indication signal upon the ramp voltage exceeding the reference voltage over the second fault time interval. The second fault time interval is greater than the prescribed transmission time interval.

A method of the present invention includes providing an optical transmitter for transmitting data onto a shared optical transmission medium; monitoring activity of the optical transmitter output and providing a fault indication signal upon optical transmitter activity occurring for a duration that exceeds a fault time interval; and deactivating the optical transmitter responsive to the fault indication signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
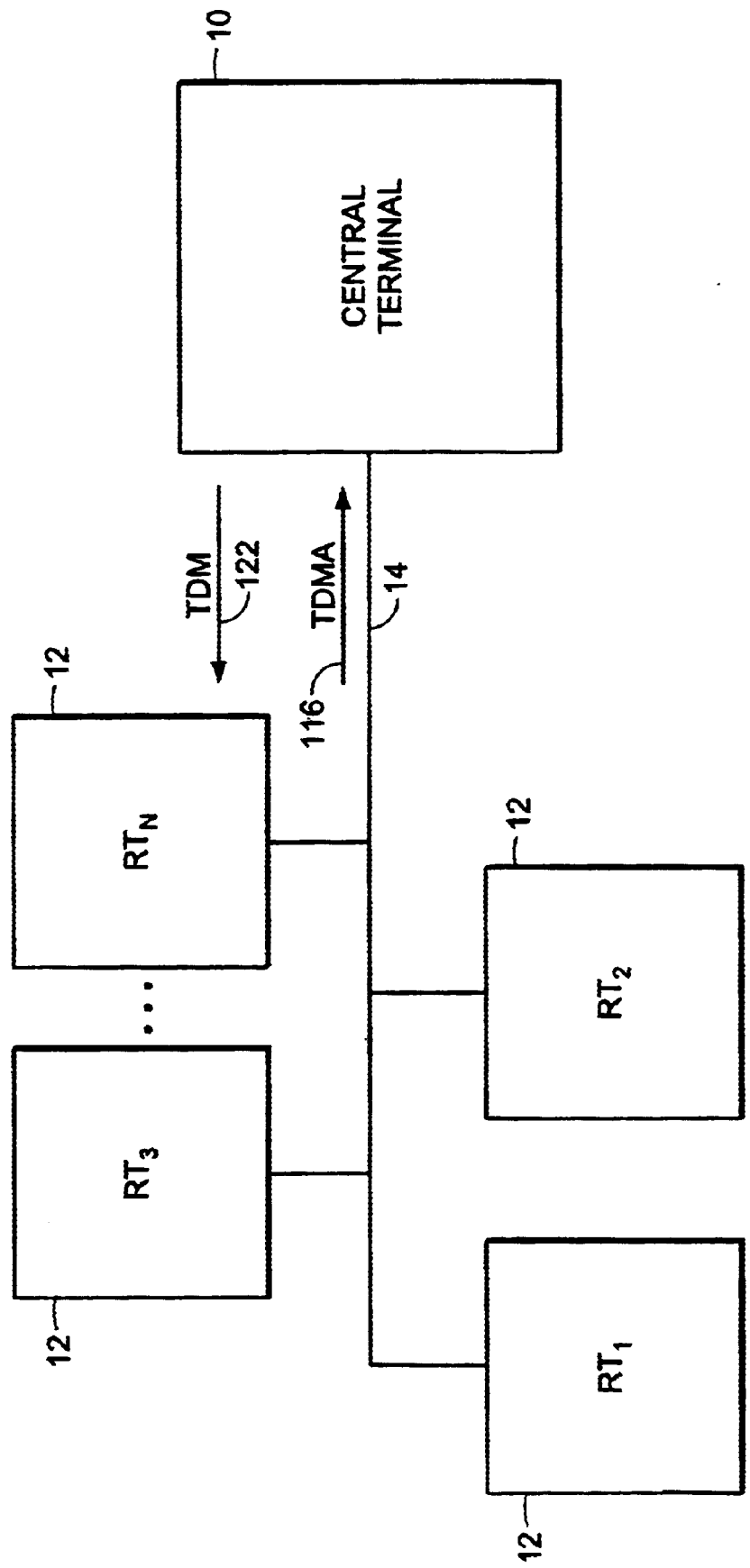
FIG. 1 is a block diagram of an optical access system.

FIG. 1 shows a block diagram of an optical access system which includes a central terminal or hub 10, remote terminals 12 designated $RT_1$, $RT_2$, $RT_3$, ..., $RT_N$ and a passive optical network (PON) 14. The system provides a downstream data signal 122 over the PON 14 from the central terminal 10 to the remote terminals 12 using time division multiplexing (TDM) transmission over the media. An upstream data signal 116 from the remote terminals 12 to the central terminal 10 over the PON 14 is provided in burst transmissions using time division multiple access (TDMA).

Note that the terms downstream and upstream are used herein to refer to the direction of transmission signal flow. The downstream direction refers to signals from the central terminal 10 toward the remote terminals 12. The upstream direction refers to signals from the remote terminals 12 toward the central terminal 10.

Figure 2:
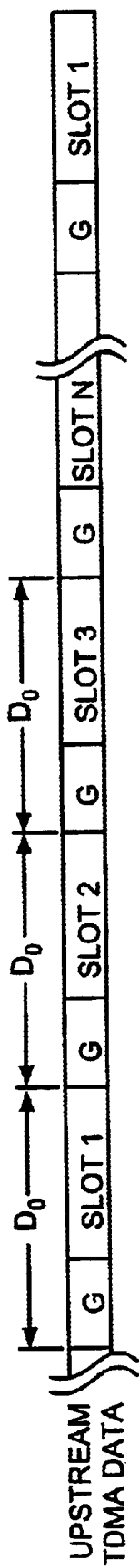
FIG. 2 is a diagram that shows a upstream TDMA signal received at a central terminal of the optical access system of FIG. 1.

Each remote terminal 12 includes an optical transmitter described further herein which in normal operation is enabled only during a time period assigned to that particular remote terminal for transmission of data onto PON 14. FIG. 2 shows the upstream data signal received at the central terminal 10 on the PON 14 from the remote terminals $RT_1$, $RT_2$, $RT_3$, ..., $RT_N$ (FIG. 1) using TDMA in multiple timeslots designated slot 1, slot 2, ..., slot N.

Using conventional ranging techniques, the proper ranging delay is calculated for each remote terminal to account for the corresponding propagation delay and the burst transmissions are timed to occur in accordance with assigned timeslots, e.g., remote terminal $RT_1$ transmits in slot 1, $RT_2$ transmits in slot 2, and $RT_N$ transmits in slot N. It should be noted that any of the remote terminals can also be assigned to transmit in multiple timeslots depending on the services provisioned for that terminal. Between each timeslot there is a guard time period G before the next TDMA burst during which no useful data is transmitted so as to avoid overlapping of bursts in adjacent timeslots. The guard period G plus the timeslot period are shown as duration $D_0$. In an embodiment, $D_0$ is about 12 microseconds.

Figure 3:
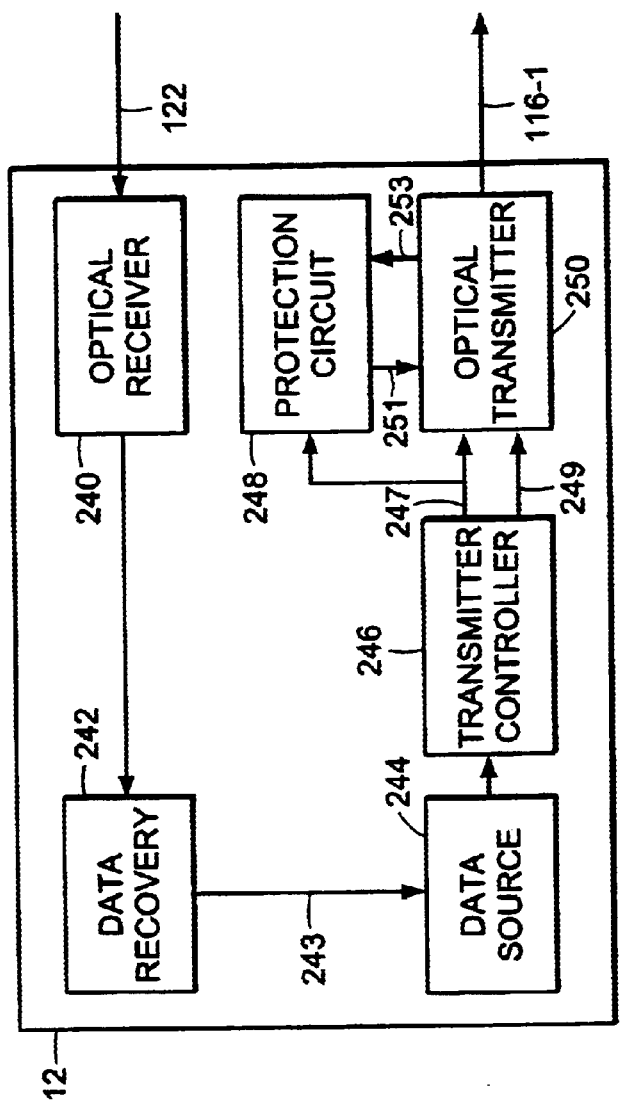
FIG. 3 is a block diagram of a remote terminal for use in the optical access system of FIG. 1.

FIG. 3 is a block diagram of remote terminal 12 of the system of FIG. 1. The remote terminal includes an optical receiver 240, data recovery circuit 242, source data block 244, transmitter controller 246, protection circuit 248 and optical transmitter 250. In the downstream direction, a downstream TDM data signal 122 is received in optical receiver 240 from the central terminal 10 (FIG. 1) and data is recovered in conventional data recovery circuit 242. The data recovery circuit 242 also provides to the source data block 244 a timing synchronization signal 243 derived from the received signal 122. In the upstream direction, synchronized source data from block 244 is provided to optical transmitter 250 through transmitter controller 246. The optical transmitter 250 transmits a burst transmission 116-1 containing upstream source data in an assigned timeslot. Each of the remote terminals is similarly configured, except that each has its own ranging delay to guarantee proper slot burst alignment.

Figure 4:
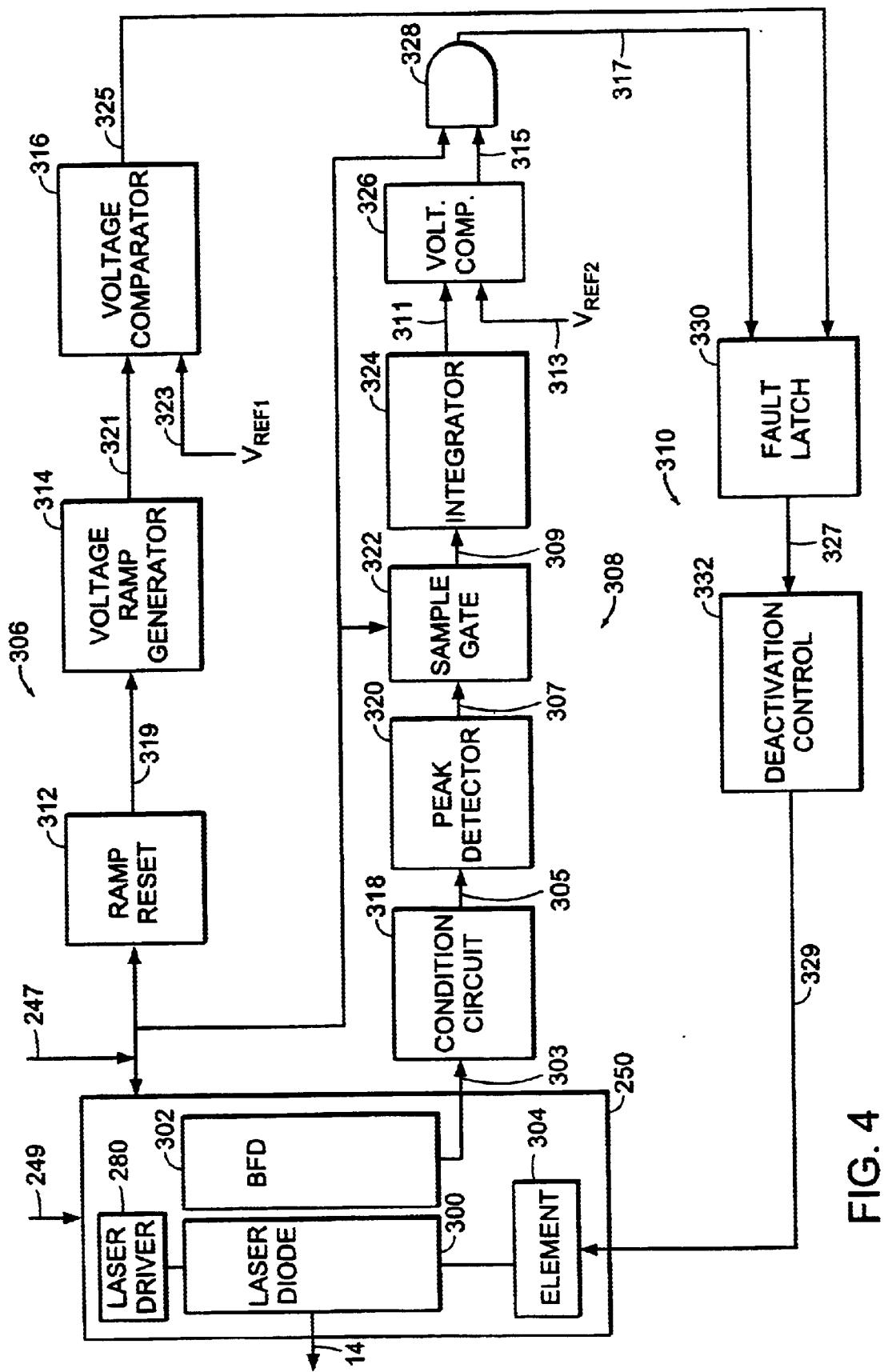
FIG. 4 is a schematic block diagram of an optical access protection circuit of the present invention.

FIG. 4 is a schematic block diagram of the optical media access protection circuit 248 of the present invention shown connected to optical transmitter 250. The optical transmitter 250 includes laser driver 280, laser diode 300, back-faced diode detector 302 and deactivation element 304. The protection circuit 248 includes fault monitoring sections 306, 308 and transmitter deactivation section 310.

The fault monitoring section 306 monitors the amount of time that an individual terminal is enabled to transmit continuously onto the shared medium. If the enabled transmission for the individual terminal exceeds a particular time interval, the laser diode 300 for the individual terminal is disabled. This fault condition can occur, for example, if the laser driver 280 operates outside its normal specification due to an internal defect of the device. The fault monitoring section 306 includes a ramp reset transistor 312 and a timer circuit which includes voltage ramp generator 314 and voltage comparator 316.

The transmit enable signal 247 from transmitter controller 246 (FIG. 3) is input to the ramp reset transistor 312. When the transmit enable signal 247 is not asserted, the reset transistor 312 conducts which prevents voltage ramp generator 314 from building up a voltage charge. When the transmit enable is asserted, the reset transistor 312 stops conducting and a slowly increasing ramp waveform signal 321 is generated by the voltage ramp generator 314. As long as the transmit enable signal 247 is asserted, the ramp continues to increase. If the transmit duration continues long enough, the ramp waveform signal 321 exceeds the set threshold reference $V_{REF1}$ 323 into comparator 316. Once the threshold is exceeded, the output of the comparator 316 provides a logic high output signal 325 which is passed to the fault latch 330 of deactivation section 310.

The fault monitoring section 308 detects whether the laser diode 300 is active for some period of time when it has not been enabled for such transmission. The fault monitoring section 308 includes conditioning circuit 318, peak detector/rectifier 320, sample gate. 322, a timer circuit comprising RC time constant integrator 324 and voltage comparator 326, and AND gate 328.

The output signal 303 of the back-faced sensing diode detector 302 provides a detection current of between 0.3 to 0.6 ma when the laser diode 300 is active and zero current when the laser diode 300 is off. Light entering the fiber transmission medium when the laser diode 300 is off has no effect on the output response of the back-faced sensing diode detector 302. The mechanism of the present invention provides the closest detection point to the fiber transmission medium as physically possible. In contrast, sensing the transmission duration from any point other than the closest detection point to the laser diode itself is less desirable from the standpoint that the optical transmitter can be vulnerable to control mechanism failures which can take down the entire network due to a malfunction.

The detected current signal 303 is fed into conditioning circuit 318 which conditions the signal. The conditioning circuit 318 includes a transimpedance amplifier which converts the detected current into a proportional voltage that is then divided and buffered to provide a signal 305 having a more desirable operating range. The conditioned signal 305 is passed through half-wave rectifier 320 which provides a peak value of the incoming AC signal. The peak signal 307 is presented to the input of sample gate 322 which comprises a field effect transistor (FET) that conducts when transmit enable signal 247 is unasserted and does not conduct when the transmit enable signal is asserted.

When the sample gate transistor 322 conducts, the peak signal 307 is passed through as gate output signal 309. The gate output signal 309 charges up RC time constant integrator 324 to remove any AC signal content and produce a DC peak signal voltage 311. When the gate transistor 322 is disabled, after having been enabled, the integrator 324 is discharged and reset. While the gate transistor 322 is enabled, the laser diode 300 should always be off and not transmitting. However, if the laser diode 300 is active while the transmit enable signal 247 is unasserted, it is likely that there has been a fault in the laser driver 280 that controls the laser diode 300. In that case, the laser diode 300 is taken off line as described below.

In the case of a fault condition with respect to the laser driver 280, the filtering RC time constant of integrator 324 charges up to a predetermined threshold set at $V_{REF2}$ input 313 of voltage comparator 326. When the threshold is exceeded by a fixed amount (e.g., 20 mv), the output 315 of the voltage comparator 326 switches to a logic high state. This logic high state passes through AND gate 328 to the transmitter deactivation section 310 when the transmit enable signal 247 is not asserted.

The foregoing describes particular timer circuit embodiments for the fault monitoring sections 306, 308 that are readily implemented, component efficient and highly reliable. It should be noted, however, that many equivalent embodiments can be selected to provide the respective timer functions described.

The transmitter deactivation section 310 deactivates the laser diode 300. The deactivation section 310 includes fault latch 330 and deactivation control block 332. The fault latch 330 is a flip flop that is operated by either of two inputs 317, 325 corresponding to logic outputs from fault monitoring sections 308, 306 respectively.

The logic high state on either inputs 317, 325 from respective fault monitoring sections 308, 306 sets the fault latch 330 to a logic high output state. The output 327 of the fault latch 330 is connected to deactivation control block 332 which includes an enhancement mode FET transistor that conducts when a logic high input from the fault latch. The current conduction of the transistor draws current through the deactivation element 304 (e.g., a fuse) of optical transmitter 250 which operates (opens) in several milliseconds to disable the laser diode 300 and thereby prevent it from transmitting on the shared medium.

While the foregoing describes an embodiment of the deactivation mechanism which disables power to the laser diode 300 through a fuse element, it should be understood that in alternate embodiments the laser diode 300 can be deactivated by disabling transmit enable control to the device.

There can be several mechanisms for recovery from the aforementioned deactivation of a faulty optical transmitter. In one approach, recovery can be done by requiring manual intervention of a craftsperson to replace the faulty optical transmitter. In another approach, the deactivation element can be a thermally sensed element rather than a fused element as described above. In this case, a gross time out (on the order of seconds) of the thermally sensed element can be required to occur before the optical transmitter is operational again.

It should be apparent to those skilled in the art that the principles of the present protection mechanism can be applied to a shared multi-drop network in which the interconnect medium is copper based, for example, in a local area interconnect or backplane application.

Figure 5A:
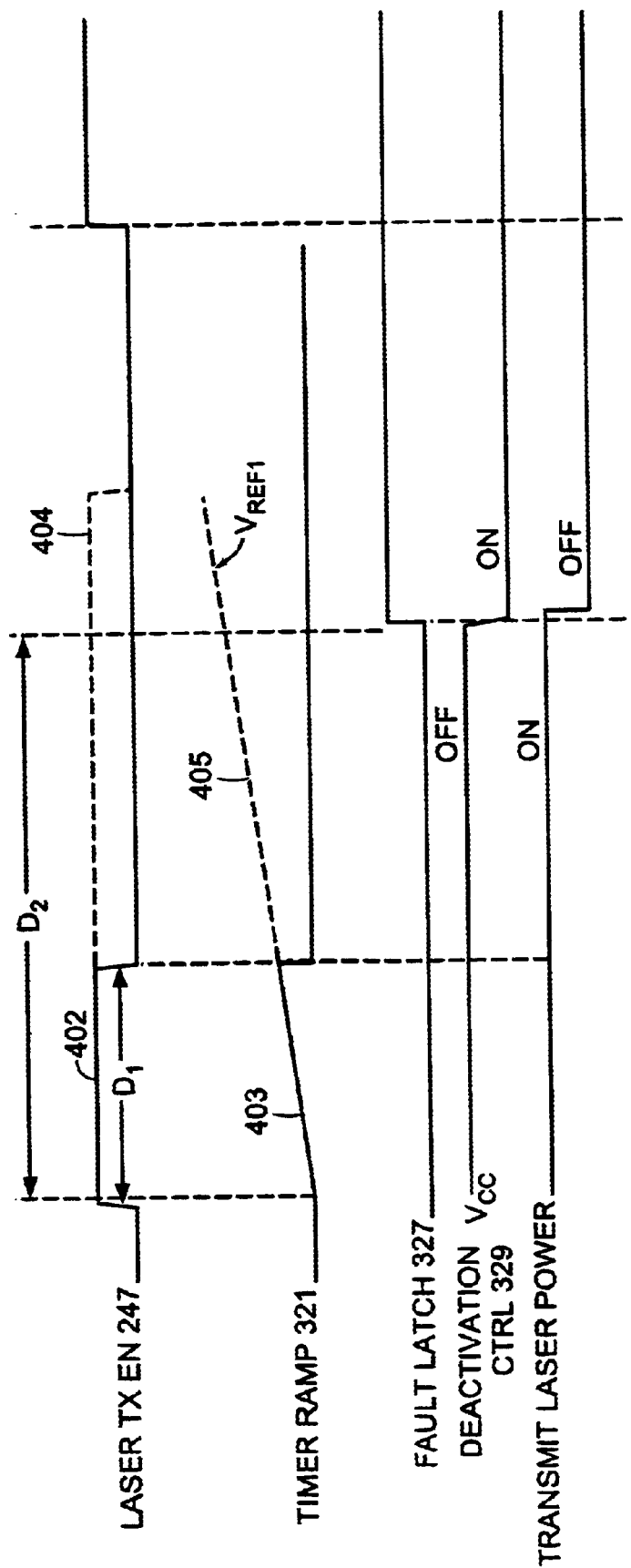
FIGS. 5A and 5B are timing diagrams illustrating operation of the optical access protection circuit of FIG. 4.
Figure 5B:
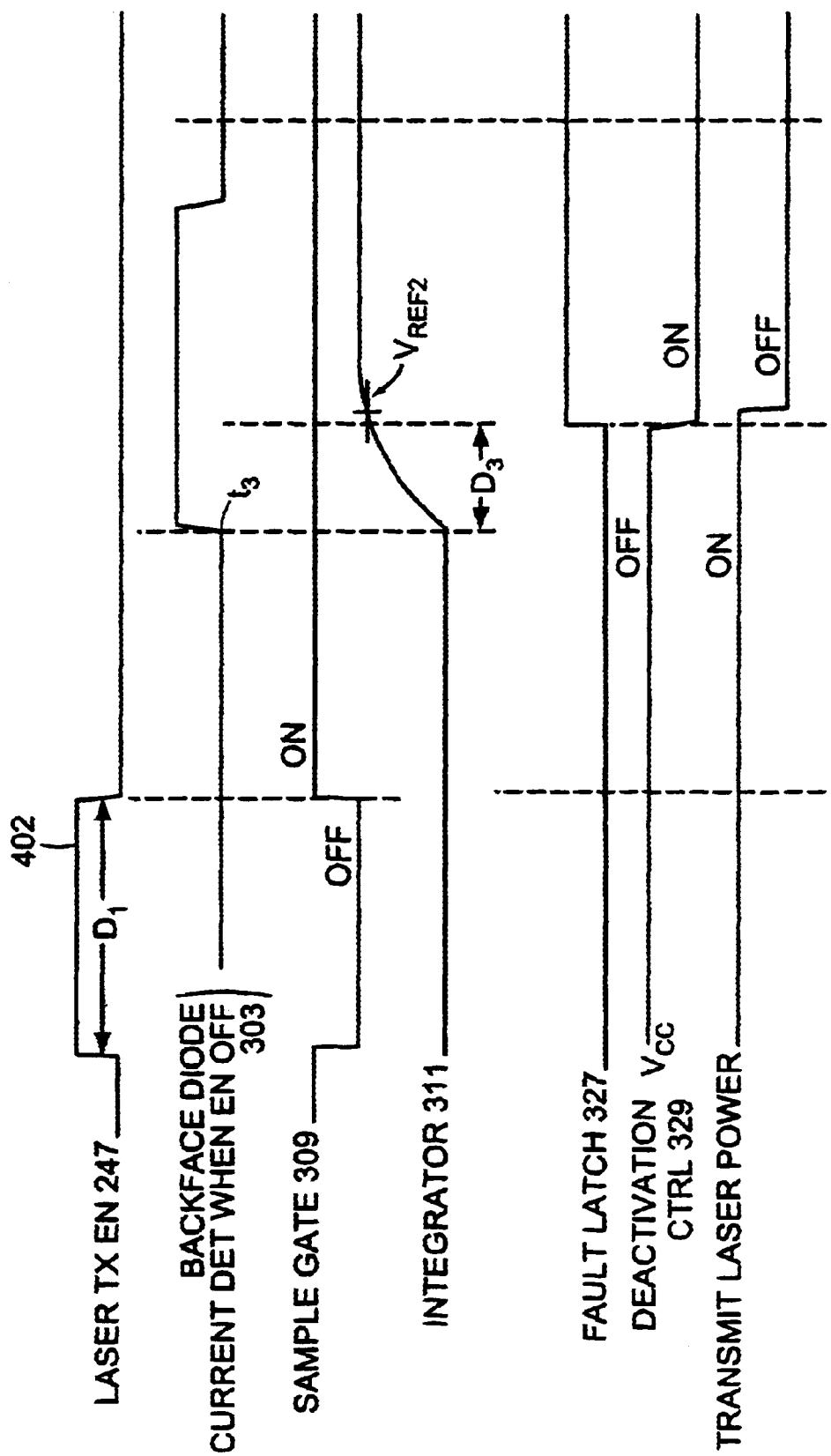

The operation of the protection circuit 248 (FIG. 4) can be further understood with reference to the timing diagrams of FIGS. 5A and 5B.

FIG. 5A shows the timing diagram for operation of monitoring section 306 (FIG. 4). As noted above, fault monitoring section 306 monitors the amount of time that an individual terminal is enabled to transmit onto the shared medium. If the enabled transmission exceeds a particular time interval, the laser diode 300 for the individual terminal is disabled.

The transmit enable signal 247 normally is asserted for a duration $D_1$ that begins and ends in succeeding guard periods G and thus approximately equals the duration $D_0$ (FIG. 2). This waveform is designated 402 in FIG. 5A. When the transmit enable is asserted, the reset transistor 312 (FIG. 4) stops conducting and a slowly increasing ramp waveform signal 321 is generated by the voltage ramp generator 314. As long as the transmit enable signal 247 is asserted, the ramp continues to increase. At the end of the normal duration $D_1$, when the transmit enable is no longer asserted, the ramp reset conducts which resets the ramp waveform designated 403. However, if the transmit enable duration continues long enough, as shown for transmit enable waveform designated 404, the ramp waveform signal designated 405 exceeds the set threshold reference $V_{REF1}$ into comparator 316. This latter duration is designated $D_2$. In an embodiment, the parameters of the voltage ramp generator 314 and voltage reference $V_{REF1}$ are selected such that the duration $D_2$ is 2.5 times normal duration $D_1$ or about 30 microseconds. Once the threshold is exceeded, the logic high output signal 325 sets the fault latch output 327 to a logic high state to cause the deactivation control signal 329 to deactivate the laser diode.

FIG. 5B shows the timing diagram for operation of monitoring section 308 (FIG. 4). As noted above, the fault monitoring section 308 detects whether the laser diode 300 is active for some period of time when it has not been enabled for such transmission. FIG. 5B shows the following signals: transmit enable signal 247, detected current signal 303, sample gate output signal 309 and integrator signal 311.

While the gate transistor 322 is enabled, the laser diode 300 should always be off and not transmitting. This is shown in FIG. 5B wherein the sample gate output signal 309 tracks the normal duration D, of the transmit enable signal 247. However, if the laser diode 300 is active while the transmit enable signal 247 is unasserted, there has been a fault in the laser driver 280 that controls the laser diode 300. This is shown in FIG. 5B as detected current signal 303 rising at a time $t_3$ when the transmit enable signal 247 is unasserted.

In this case of a fault condition with respect to the laser driver 280, the filtering RC time constant of integrator 324 charges up to a predetermined threshold set at voltage reference $V_{REF2}$. When the threshold is exceeded by a fixed amount (e.g., 20 mv), a logic high state is passed to set the fault latch. Fault latch output 327 at a logic high state causes the deactivation control signal 329 to deactivate the laser diode. The RC time constant is selected to have a duration $D_3$ that is 0.5 times normal duration $D_1$ or about 6 microseconds.

While this invention has been particularly shown and described with references to preferred embodiments thereof, it will be understood by those skilled in the art that various changes in form and details may be made therein without departing from the scope of the invention encompassed by the appended claims.

What is claimed is:

1. In an optical communications system having plural remote terminals coupled to a central terminal over a shared optical transmission medium, the plural remote terminals configured to transmit data on the shared optical transmission medium at prescribed transmission time intervals and in a prescribed sequence, remote terminal apparatus comprising:

an optical transmitter for transmitting data onto the shared optical transmission medium;

a fault monitoring circuit coupled to the optical transmitter for monitoring activity of the optical transmitter and providing a first fault indication signal upon optical transmitter activity occurring for a duration that exceeds a fault time interval; and a deactivation circuit responsive to the first fault indication signal to deactivate the optical transmitter;

further comprising a transmitter controller providing a transmit enable signal for enabling the optical transmitter wherein under normal operation of the remote terminal the transmit enable signal is asserted during the prescribed transmission time interval and wherein the optical transmitter includes an optical detector for detecting the presence of optical transmitter energy into the shared medium to provide an activity signal to the fault monitoring circuit which operates to provide the first fault indication signal upon the transmit enable signal being unasserted and the activity signal being present for a duration that exceeds the fault time interval.

2. The remote terminal apparatus of claim 1 wherein the fault monitoring circuit includes a timer circuit having an input coupled to the activity signal for establishing the fault time interval.

3. The remote terminal apparatus of claim 2 wherein the fault time interval is less than the prescribed transmission time interval.

4. The remote terminal apparatus of claim 1 further comprising a second fault monitoring circuit for monitoring the transmit enable signal to provide a second fault indication signal upon the transmit enable signal being asserted for a duration exceeding a second fault time interval and wherein the deactivation circuit includes a fault latch for latching the first and second fault indication signals for deactivating the optical transmitter.

5. The remote terminal apparatus of claim 4 wherein the second fault monitoring circuit includes a second timer circuit having an input coupled to the transmit enable signal for establishing the second fault time interval.

6. The remote terminal apparatus of claim 5 wherein the second timer circuit includes a voltage ramp generator having an input coupled to the transmit enable signal to provide a ramp voltage and a voltage comparator having a first input coupled to the ramp voltage and a second input coupled to a reference voltage wherein the voltage comparator is operable to provide the second fault indication signal upon the ramp voltage exceeding the reference voltage.

7. The remote terminal apparatus of claim 5 wherein the second fault time interval. is greater than the prescribed transmission time interval.

8. The remote terminal apparatus of claim 7 wherein the second fault time interval is of the same order of magnitude as the prescribed transmission time interval.

9. In an optical communications system having plural remote terminals coupled to a central terminal over a shared optical transmission medium, the plural remote terminals configured to transmit data on the shared optical transmission medium at prescribed transmission time intervals and in a prescribed sequence, remote terminal apparatus comprising:

an optical transmitter for transmitting data onto the shared optical transmission medium having a backfaced PIN diode for detecting the presence of optical transmitter energy into the shared medium to provide an activity signal;

a transmitter controller providing a transmit enable signal for enabling the optical transmitter wherein under normal operation of the remote terminal the transmit enable signal is asserted during the prescribed transmission time interval;

a first fault monitoring circuit responsive to the activity signal to provide a first fault indication signal upon the transmit enable signal being unasserted and the activity signal being present for a duration that exceeds a first fault time interval;

a second fault monitoring circuit for monitoring the transmit enable signal to provide a second fault indication signal upon the transmit enable signal being asserted for a duration exceeding a second fault time interval; and a deactivation circuit having a fault latch for latching the first and second fault indication signals for deactivating the optical transmitter.

10. The remote terminal apparatus of claim 9 wherein the first fault time interval is less than the prescribed transmission time interval.

11. The remote terminal apparatus of claim 9 wherein the second fault time interval is greater than the prescribed transmission time interval.

12. In an optical communications system having plural remote terminals coupled to a central terminal over a shared optical transmission medium, the plural remote terminals configured to transmit data on the shared optical transmission medium at prescribed transmission time intervals and in a prescribed sequence, remote terminal apparatus comprising:

an optical transmitter for transmitting data onto the shared optical transmission medium;

a transmitter controller providing a transmit enable signal for enabling the optical transmitter wherein under normal operation of the remote terminal the transmit enable signal is asserted during the prescribed transmission time interval;

a fault monitoring circuit for monitoring the transmit enable signal to provide a fault indication signal upon the transmit enable signal being asserted for a duration exceeding a fault time interval; and a deactivation circuit responsive to the fault indication signal to deactivate the optical transmitter.

13. The remote terminal apparatus of claim 12 wherein the fault monitoring circuit includes a voltage ramp generator having an input coupled to the transmit enable signal to provide a ramp voltage and a voltage comparator having a first input coupled to the ramp voltage and a second input coupled to a reference voltage wherein the voltage comparator is operable to provide the fault indication signal upon the ramp voltage exceeding the reference voltage in the fault time interval.

14. The remote terminal apparatus of claim 13 wherein the fault time interval is greater than the prescribed transmission time interval.

15. In a remote terminal of an optical communications system having plural remote terminals coupled to a central terminal over a shared optical transmission medium, the plural remote terminals configured to transmit data on the shared optical transmission medium at prescribed transmission time intervals and in a prescribed sequence, a method comprising:

providing an optical transmitter for transmitting data onto the shared optical transmission medium;

monitoring activity of the optical transmitter and providing a first fault indication signal upon optical transmitter activity occurring for a duration that exceeds a fault time interval; and deactivating the optical transmitter responsive to the first fault indication signal; further comprising providing a transmit enable signal for enabling the optical transmitter wherein under normal operation of the remote terminal the transmit enable signal is asserted during the prescribed transmission time interval and wherein monitoring includes detecting the presence of optical transmitter energy into the shared medium to provide an activity signal and further includes providing the first fault indication signal upon the transmit enable signal being unasserted and the activity signal being present for a duration that exceeds a fault time interval that is less than the prescribed transmission time interval.

16. The method of claim 15 further comprising monitoring the transmit enable signal to provide a second fault indication signal upon the transmit enable signal being asserted for a duration exceeding a second fault time interval and wherein the deactivating includes latching the first and second fault indication signals for deactivating the optical transmitter.

17. The method of claim 16 wherein the second fault time interval is greater than the prescribed transmission time interval.

* * * * *